J. R. ST. JOHN.
Compass.
No. 8,785. Patented March 2, 1852.
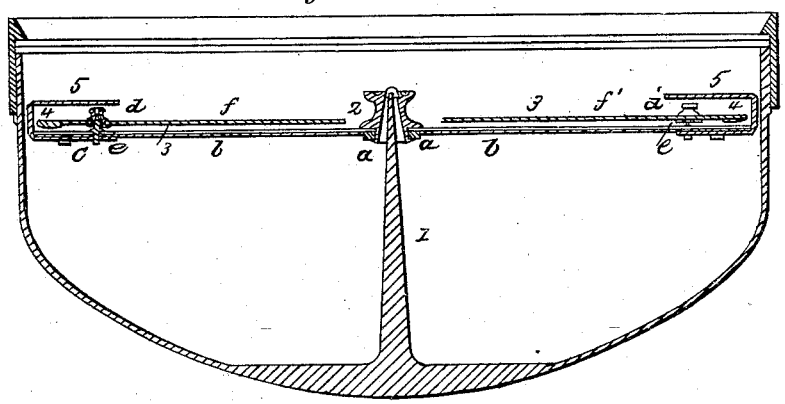
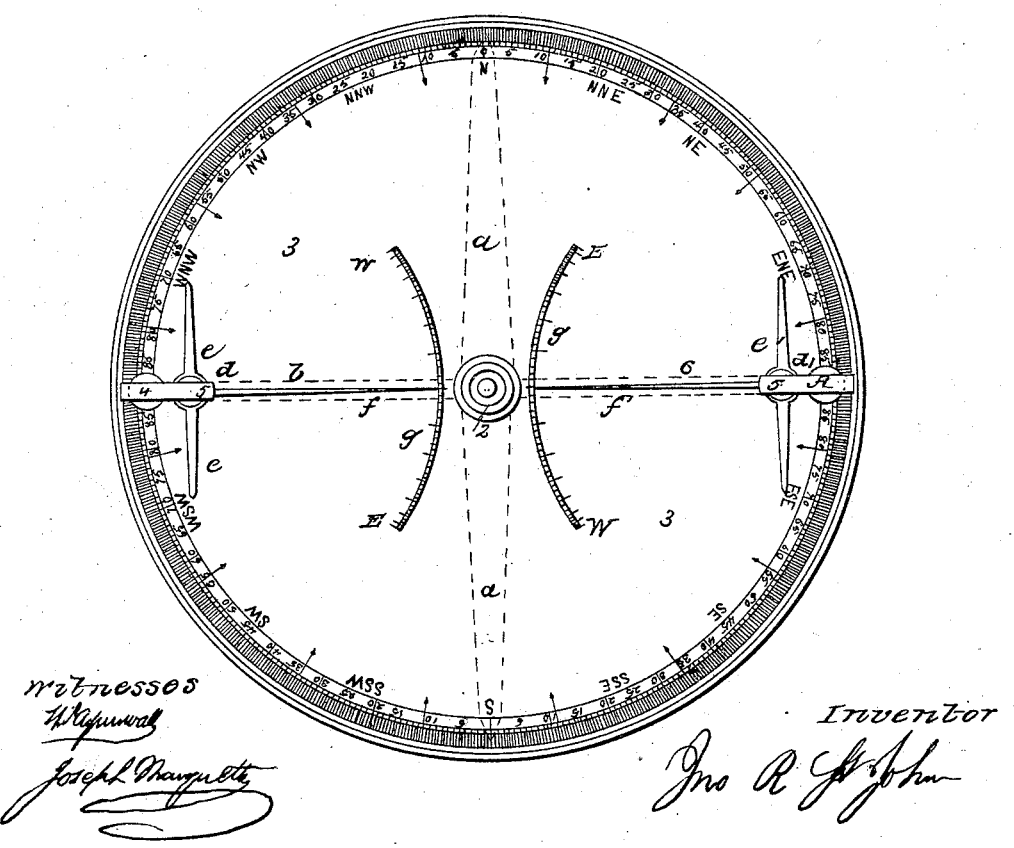

UNITED STATES PATENT OFFICE.

JNO. R. ST. JOHN, OF NEW YORK, N. Y., ASSIGNOR TO JAS. RENWICK, GEO. F. BARNARD, AND EDWD. B. ST. JOHN.

COMPASS FOR DETERMINING VARIATIONS FROM LOCAL CAUSES.

Specification of Letters Patent No. 8,785, dated March 2, 1852.

*To all whom it may concern:*

Be it known that I, JOHN R. ST. JOHN, late of the city of Buffalo, now of the city, county, and State of New York, engineer and printer, have discovered a new mode and invented and applied means for using such new mode to determine and indicate on inspection the variation or deflection of the magnetic needle from the magnetic meridian, such discovery and invention effecting new and useful improvements upon the well-known magnetic compass, which I have termed, collectively, the Self-Determining Local Variation-Compass; and that the following is as full, clear, and exact a description as it is possible to give of the construction, preparation, operation, and effects of the said discovery and improvements, reference being had to the drawing annexed to and making part of this my specification of the said discovery and improvements, wherein—

Figure 1, is a plan and Fig. 2, is a sectional elevation, of a compass fitted with my said improvements.

The like letters and numbers as marks of reference apply to the same parts in each figure, as follows:

1, is a spindle, or pin, see Fig. 2, to carry the cap 2, which sustains the ordinary compass card 3, and the main magnetic needle $a$, shown by dotted lines, in Fig. 1, as under the card 3. These are, so far, made as usual, but between the cap 2, and needle $a$, a cross bar $b$, shown by dotted lines in Fig. 1, is fitted under the common card, or may be made to carry a circle of thin metal, on which the usual divisions of the compass may be marked; but in either case, the ends of the bar $b$, are each fitted with a pin, or spindle $c$, or $c'$, that sustains a cap $d$, or $d'$, each cup carrying an index arm $f$, or $f'$, the shorter ends of each of these, have a balance weight 4, to keep the arms horizontal, and the ends of the bar $b$, are each fitted with a forked shield, or keeper piece, 5, one tongue of which is secured beneath the bar $b$, the other tongue turns inward, and over the caps $d$, or $d'$, so as to keep them, and the index arms $f$, or $f'$, upon the pins $c$, or $c'$. Beneath these caps and arms, are fitted the auxiliary or satelite magnetic needles $e$, and $e'$. On the card, or on two metal arms attached to, or made with the bar $b$, if a frame is used, instead of a card, as before noticed, are two graduated sectors $g$, $g$, for use as hereafter set forth. This completes the general construction, and description, of the compass proper; the box, in which it is placed, is shown in the usual form, but may be fitted in any other convenient manner, the preparation of the needles, and the adjustment of the other parts, being as follows:

The main needle $a$, is to be properly and evenly hardened, at each end, and is to have these as equally charged as possible, by giving each the needful number of touches, with the proper poles of the inductive magnet; and the position of the magnetic needle $a$, under the card, or frame, in relation to the cardinal points, is to be the same as now usual; and the best of even grained steel is to be used, in making both needles and satellites.

The auxiliary, or what are here termed the satellite needles, are to be placed as shown in the drawing, with their centers as nearly as possible, equidistant from the main center, and from the centers of the poles of the main needle; they are to be about one fifth of the length of the main needle, they are to be about one thirtieth part of the weight of the main needle; and are to be hardened, and charged at the ends, by the inductive magnet, in precisely the same manner as the main needle, and the satellite needles, and index arms $f$, and $f'$, with the caps $d$, and $d'$, are to be properly balanced in place, on the pins $c$, $c'$, before these needles are charged by the inductive magnet. For adjusting the magnetizing of the satellite needles, the main needle, when duly charged, must be laid, and kept, in the magnetic meridian, until the satellites are charged, and this is to be done, by touching them with the proper poles of the inductive magnet, a sufficient number of times, to make them stand parallel with the main needle; with the north pole of each satellite needle toward the south pole of the main needle, and vice versa; and to make them work true, the charge must be increased, or diminished, as the progress of the operation may show to be needful. If, for instance, the north pole of either satellite be too weak, it must be touched by the south pole of the inductive magnet. If after that, it be too strong, the south pole of the satellite must be touched by the north pole of the inductive magnet. If both poles become too strong for the proper effect above described either may be weakened, by touching it with the similar pole of the inductive magnet. To avoid this, the first charge of the satellites should be quite weak, to admit of strengthening up, to the point of equal relation or position with the main needle and the nonius; and care should be taken, not to give the satellites a maximum charge at first. This process requires great care, attention, and patience, and should not be hurried, as it is not possible to foretell the number of touches needful, because there is no means to measure the amount of susceptibility to the influence of the main needle, which the first touch of the inductive magnet may give to the satellite; nor can the increase or diminution of this susceptibility, by any subsequent touch, be foreknown; therefore the process must be patiently followed up, until the satellites stand parallel to the main needle; when the index arms $f$, and $f'$, standing at right angles to the satellites, will be in the same line, or in the equator of the compass card, or frame, at the point marked $o$, which is the nonius of each sector scale $g$, and is the point of "no variation" of the main needle $a$.

The satellites being thus equally charged and adjusted, the sector scales $g$, are then to be graduated, as follows: The line of the scale being marked on the card, or frame, from the pins $c, c'$, as centers, at the northern extremity of the sector scale line, on the east side, place the letter E, and at the southern extremity, the letter W. At the northern extremity of the sector scale, on the west side, place the letter W, and at the other end the letter E. With the nonius $o$, on the equator of the card, and under the points of the index arms $f, f'$, move the main needle one degree, either east or west, of the magnetic meridian, and let it lie there; when the satellites have settled perfectly still, make a point mark, on the line of the scale, under the point of each index arm. This done, move the main needle one degree over, and past the meridian, the other way; and when the satellites have become perfectly still, mark under the index arms, as in the first case. Proceed thus alternately, until the scales are marked each way, as high as the satellites will work, before they turn back, or stand still, when the main needle is moved forward either way, which will depend entirely on the susceptibility of the needles, for which reason, it will be almost impossible to make two sector scales alike, for different needles, and rarely or never beyond ninety degrees, though a full circuit of the satellites may be made, by adjusting them with a light charge, and at a sufficient distance, to have their poles reversed from the above process, or pointing in the same direction as the poles of the main needle.

By the first described arrangement, and charging of the satellites, when the main needle passes ninety degrees from the north, either way, the satellites and index arms will begin to return upon their scales, as the main needle continues to vary, and leave the magnetic meridian, beyond ninety degrees; but they will both stand at nonius $o$, when the north pole of the main needle is made to point to the magnetic south; and from thence, up to ninety degrees, on the main needle returning, the satellites, with the index arms, will proceed upon the sector scales, and from ninety to the magnetic north, they will gradually return to nonius $o$, when the main needle arrives at the magnetic meridian.

It will be understood, by the foregoing description of the construction of the compass, and the preparation and adjustments of the satellites and sectors, that the letters E, indicate easterly variation, and the letters W, indicate westerly variation, according to the direction the arms $f, f'$, tend to, from their respective noniuses; and the amount of this variation, either way, under all ordinary causes, with usual protection to the compass, will be ascertained, as follows. When there is no other than magnetic variation, the index arms will each be over its respective nonius, or $o$. But when these vary, so that each index arm, or pointer, is any given number of degrees on opposite sides, away from its nonius, add the two amounts together, and the half of this sum will be the amount of the actual variation, other than magnetic for whichever letter, whether E, or W, that the pointers may both tend toward, from the nonius. But if both indexes shall be either north, or south, of the equator or nonius, between the east and west points of the sectors, subtract the less from the greater angel, and the balance will be the variation of the main needle, from the magnetic meridian in the direction shown by the greater angle. But such a circumstance will, at once, and inevitably, indicate the existence of some unusual, or extraordinary artificial or accidental disturbing local cause, in the vicinity of the compass, either at the north or south side, whichever the pointers may incline to.

Having tried one satellite needle, in every position around the compass, and having also tried as many as seven satellites, in all possible positions, I decide on using two, acting in the line of the equator, and with their centers as nearly as possible, equidistant from the centers of the poles of the main needle, as the most effective and perhaps the only mode, fitted to meet all ordinary contingencies; so that while they generally will indicate ordinary variations of the main needle, they absolutely indicate, and enable the mariner and surveyor, to know, or determine the presence and action, of any unusual and extraordinary accidental or artificial local disturbing causes, in the vicinity of the compass, in every situation, or service, in which the instrument is needed, or can be used; these being the effects produced, by my herein described discovery, invention, and improvements, and the mode of constructing, preparing, and arranging the same.

I do not claim the invention of a new mariners, or surveyors, compass, because these improvements can, in most instances, be added to compasses already in use; but I do claim as new, and of my own discovery, or invention and improvements, and desire to secure by Letters Patent of the United States—

The application of satellite, or auxiliary needles, to the magnetic compass, such needles being prepared, applied, and adjusted, in the manner, and for the purposes, as herein set forth; including any merely mechanical variations, that shall be actual equivalents of the means employed, as described and shown herein, and substantially the same, as applied by me, for the purposes here set forth.

In witness whereof, I have hereunto signed my name in the city of Washington, this twentieth day of September, one thousand eight hundred and fifty.

JOHN R. St. JOHN.

Witnesses:
 J. H. Goddard,
 J. H. Goddard, Jr.